C. SMITH.
Harrows.

No. 135,448.

Patented Feb. 4, 1873.

Witnesses: Solon White, R. A. Downg

Cyrus Smith, Inventor.

UNITED STATES PATENT OFFICE.

CYRUS SMITH, OF IRWIN'S STATION, PENNSYLVANIA.

IMPROVEMENT IN HARROWS.

Specification forming part of Letters Patent No. 135,448, dated February 4, 1873.

*To all whom it may concern:*

Be it known that I, CYRUS SMITH, of Irwin's Station, Westmoreland county and State of Pennsylvania, have invented a new and useful Improvement in Harrows; and I hereby declare the following to be a full and exact description of the same, and the manner of using it, sufficient to enable those skilled in the art to put it into practice, reference being had to the accompanying drawing, in which—

Figure 1:
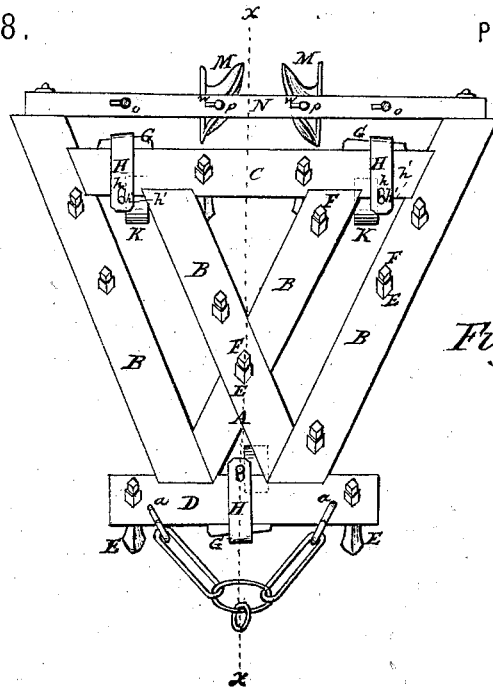
Figure 2:
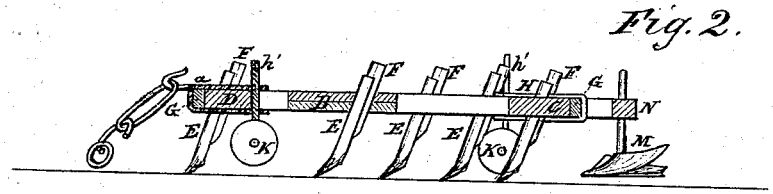

Figure 1 is a plan view, and Fig. 2 is a vertical longitudinal section on the line $x\ x$ of Fig. 1.

The frame A of my harrow is composed of seven pieces, viz: The head D, diagonals B B B B, cross-bar C, and the plow-bar N. The teeth E are from ten to twelve inches long, by one and three-fourths inch wide, and are constructed of one-fourth-inch steel bent at right angles in cross-section, and set in the frame at an angle of about twenty-two degrees from perpendicular. The lower end of the tooth is brought to an angular point and spread out so as to present a surface of about two and a half inches in cross-section, and curved forward somewhat to facilitate its going into the ground. The teeth are arranged so as to cut or pulverize all the ground evenly and smoothly, no two being in line of draft, and by means of the wide hitching-points $a\ a$, from thirty-six to forty-two inches apart, any tendency in the teeth to "track" or follow in the wake of each other is effectually prevented, the head D being especially widened for that purpose. By its use the harrow is found to draw steadily and with great regularity. The teeth are secured in place by wedges or keys to admit of their ready removal or adjustment to suit the nature of the ground. Ground covered with manure or weeds will choke the harrow at an ordinary adjustment of the teeth if no means are provided for its relief.

The devices which I have provided for this purpose I will now describe. The clevis-shaped straps H H H are of wrought or malleable metal, and pass around the timbers of the frame, as shown in section in Fig. 2. Through the oblong slots $h\ h$ pass vertical rods $h'\ h'$, terminating at their lower ends in short horizontal arms, forming spindles for the wheels K K K. The rods $h'$ are held firmly at any required point of adjustment, as to elevation, by means of wedges G G G. When ground covered with manure or weeds is to be harrowed, it is necessary to set the wheels at the highest point to allow the teeth to reach far enough through this top covering to penetrate a sufficient depth into the soil and to prevent choking. It is also frequently desirable to set the wheels entirely below the teeth in conveying the harrow to and from the field, across a meadow, or along a road, or at any time when the action of the teeth is to be entirely suspended. By having this ready means of adjustment at hand the harrow can also be quickly adjusted, so that the teeth may penetrate the soil to any depth from one to six inches. Such adjustment may be readily made in a few moments. The rods $h'$ are, in practice, made square or flat in cross-section, to prevent turning casually or working loose. The same facility is provided for adjusting the harrow-teeth. The wedges or keys F are driven upward until loose, when the teeth E may be adjusted to any depth and the wedges again driven tight. By giving the teeth the inclination and curve shown in Fig. 2, they have sufficient tendency to draw into the soil without the necessity of adding dead weight to force them in, as is the case with other harrows. The implement therefore being much lighter in structure, draws easily upon the horses, and is readily handled, and therefore better taken care of by proper housing away from the weather after use.

Common harrows only mellow the soil to about the depth of three inches, oftener less than more, while my harrow readily penetrates and mellows the soil five or six inches, or more if wanted. Common harrows have the small end of the tooth downward and in a vertical position, and their tendency is to keep out of the ground and ride over it. I put the large end down and give it a self-drawing inclination. My tooth up at the wood is as large as the common harrow-tooth, so that the soil at the surface is mellowed fully as much as is practicable with the common harrow, and twice as much below, and at much greater depth, and with much less labor.

Attached to the cross-beam or bar N are a series (two or four) light mold-boards or plows, M M, by means of adjustable vertical rods $p$ $p$, also made square in practice, and provided with adjusting and holding wedges *w*, as shown. Four holes are shown, two middle ones containing plows, and two additional ones, *o o*, into which in certain kinds of work these plows are shifted or additional ones are supplied. The object of the two plows, as shown, is to throw the ground into a ridge along the track of the harrow. The plows M M are set to penetrate the soil two inches less in depth than the harrow-teeth, and in following teeth penetrating six inches they will penetrate four, throwing up a ridge six or eight inches high, leaving it flat on the top, and with two inches of fine loose soil under the bottom of the furrows or grooves left by the plows. Four light plows arranged in pairs on both sides of the harrow, instead of in the middle, as shown, would, of course, throw up two ridges equidistant. The double-tree would then be lengthened so that one of the horses would walk in the furrow last made, and thus secure uniformity over the whole field. For marking out corn but two plows would be used. This is done at the last harrowing. After marking one way the harrow-teeth are removed and the plows left in for marking out crosswise for planting, and after the corn is dropped by driving back the contrary way the ground is thrown over the corn and the planting is complete to any depth desired, from one to six inches, and there is always left at least two inches of fine mellow soil under the corn for it to take root in.

In planting with ordinary harrows, on the contrary, the top of the ground only is mellowed, and the marking-out plow runs through to the bottom of the loose ground, leaving the corn to rest upon hard unharrowed soil and root as it best can, besides the great loss of time required in double working when the harrow and plows are detached and the latter used singly. With my harrow the marking is done simultaneously with the last harrowing, and the cross-marking by a double plow, thus saving three times going over the ground, and doing the work much better and with greater regularity.

By arranging the plows to throw right and left, the ground can be prepared for planting potatoes. To change the plows from ridging to marking, the shanks or rods are shifted from *p p* to *o o* in the bar N.

I make no claim to the peculiar form of tooth shown, nor do I claim any of the separate features of the harrow singly, as they have been used in various other machines and implements; but What I do claim as my invention, and desire to secure by Letters Patent, is—

1. The arrangement of the teeth E, constructed as described, and applied to the frame A B C, provided with adjustable wheels K K K, and wide hitching-head D, when constructed and arranged as and for the purpose set forth.

2. In connection with the above, the plows M M attached to the removable bar N and to the harrow-frame, constructed as shown and described, and operating as set forth.

CYRUS SMITH.

Witnesses:
   L. STUHLE,
   S. D. LAUFFER.